United States Patent
Ebrahimi Afrouzi et al.

(10) Patent No.: US 9,972,098 B1
(45) Date of Patent: May 15, 2018

(54) REMOTE DISTANCE ESTIMATION SYSTEM AND METHOD

(71) Applicants: Ali Ebrahimi Afrouzi, San Jose, CA (US); Soroush Mehrnia, Copenhagen (DK)

(72) Inventors: Ali Ebrahimi Afrouzi, San Jose, CA (US); Soroush Mehrnia, Copenhagen (DK)

(73) Assignee: AI Incorporated, Toronto (CA)

( * ) Notice: Subject to any disclaimer, the term of this patent is extended or adjusted under 35 U.S.C. 154(b) by 0 days. days.

(21) Appl. No.: 15/243,783

(22) Filed: Aug. 22, 2016

Related U.S. Application Data

(60) Provisional application No. 62/208,791, filed on Aug. 23, 2015.

(51) Int. Cl.
| | |
|---|---|
| *H04N 5/262* | (2006.01) |
| *H04N 7/18* | (2006.01) |
| *G06T 7/70* | (2017.01) |
| *G01S 11/12* | (2006.01) |
| *G06T 11/60* | (2006.01) |
| *G06K 9/62* | (2006.01) |
| *H04N 5/225* | (2006.01) |

(52) U.S. Cl.
CPC ............... *G06T 7/70* (2017.01); *G01S 11/12* (2013.01); *G06K 9/6202* (2013.01); *G06T 11/60* (2013.01); *H04N 5/2256* (2013.01)

(58) Field of Classification Search
CPC ......... H04N 5/2256; G06T 11/60; G06T 7/70; G06K 9/6202; G01S 11/12
See application file for complete search history.

(56) References Cited

U.S. PATENT DOCUMENTS

| | | |
|---|---|---|
| 5,054,912 A | 10/1991 | Kuchel |
| 6,545,749 B1 | 4/2003 | Andersson |
| 6,847,435 B2 | 1/2005 | Honda et al. |
| 7,187,452 B2 | 3/2007 | Jupp et al. |
| 7,796,782 B1 | 9/2010 | Motamedi et al. |
| 7,889,324 B2 | 2/2011 | Yamamoto |
| 7,995,799 B2 | 8/2011 | Schultz et al. |
| 8,558,993 B2 | 10/2013 | Newbury et al. |
| 2005/0280802 A1 | 12/2005 | Liu |
| 2012/0185091 A1* | 7/2012 | Field ............... G05D 1/0044 700/254 |
| 2014/0225988 A1* | 8/2014 | Poropat ............. G01S 17/89 348/46 |

(Continued)

*Primary Examiner* — Lin Ye
*Assistant Examiner* — John H Morehead, III

(57) ABSTRACT

A distance estimation system comprised of a laser light emitter, two image sensors, and an image processor are positioned on a baseplate such that the fields of view of the image sensors overlap and contain the projections of an emitted collimated laser beam within a predetermined range of distances. The image sensors simultaneously capture images of the laser beam projections. The displacement of the laser beam projection from a first image taken by a first image sensor to a second image taken by a second image sensor is extracted by the image processor. The displacement is compared to a preconfigured table relating displacement distances with distances from the baseplate to projection surfaces to find an estimated distance of the baseplate from the projection surface at the time that the images were captured.

9 Claims, 4 Drawing Sheets

(56) References Cited

U.S. PATENT DOCUMENTS

| | | | | |
|---|---|---|---|---|
| 2015/0036886 A1* | 2/2015 | Matono | ............... | G08G 1/166 |
| | | | | 382/106 |
| 2015/0338204 A1* | 11/2015 | Richert | ............... | G06T 7/593 |
| | | | | 348/135 |
| 2015/0381968 A1* | 12/2015 | Arora | ............... | G06T 17/00 |
| | | | | 348/47 |

* cited by examiner

REMOTE DISTANCE ESTIMATION SYSTEM AND METHOD

CROSS-REFERENCE TO RELATED APPLICATIONS

This application claims the benefit of the provisional patent application Ser. No. 62/208,791 filed Aug. 23, 2015 by the present inventors.

FIELD OF THE INVENTION

This disclosure relates to remote distance estimation systems.

BACKGROUND OF THE DISCLOSURE

Mobile robotic devices are being used more and more frequently in a variety of industries for executing different tasks with minimal or no human interactions. Such devices rely on various sensors to navigate through their environment and avoid driving into obstacles.

Infrared sensors, sonar and laser range finders are some of the sensors used in mobile robotic devices. Infrared sensors typically have a low resolution and are very sensitive to sunlight. Infrared sensors that use a binary output can determine whether an object is within a certain range, but are unable to accurately determine the distance to the object. Sonar systems rely on ultrasonic waves instead of light. Under optimal conditions, sonar systems can be very accurate, however, sonar systems have limited coverage areas; if used in an array, they can produce cross-talk and false readings; if they are installed too close to the ground, signals can bounce off the ground, degrading accuracy; and sound-absorbing materials in the area can produce erroneous readings.

Laser Distance Sensors (LDS) are a very accurate method for measuring distance that can be used on robotic devices, but, due to their complexity and cost, these sensors are typically not a suitable option for robotic devices intended for day-to-day home use. These systems generally use two types of measurement methods: Time-of-Flight (ToF) and Triangulation. In ToF methods, the distance of an object is calculated based on the round trip of the emission and reception of a signal. In Triangulation methods, there is a source and a sensor on the device with a fixed baseline. The emitting source emits the laser beam at a certain angle. When the sensor receives the beam, the sensor calculates the degree at which the beam entered the sensor. Using those variables, the distance traveled by the laser beam may be calculated with triangulation.

A need exists for a more accurate and reliable, yet affordable method for automatic remote distance measuring.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

The present invention introduces new method and system for distance estimation. This invention presents a distance estimation system comprising a laser light emitter disposed on a baseplate emitting a collimated laser beam which projects a light point onto surfaces opposite the emitter; two image sensors disposed symmetrically on the baseplate on either side of the laser light emitter at a slight inward angle towards the laser light emitter so that their fields of view overlap while capturing the projections made by the laser light emitter; an image processor to determine an estimated distance from the baseplate to the surface on which the laser light beam is projected using the images captured simultaneously and iteratively by the two image sensors. Each image taken by the two image sensors shows the field of view including the point illuminated by the collimated laser beam. At each discrete time interval, the image pairs are overlaid and the distance between the light points is analyzed by the image processor. This distance is then compared to a preconfigured table that relates distances between light points with distances from the baseplate to the projection surface to find the actual distance to the projection surface.

In some embodiments the assembly may be mounted on a rotatable base so that distances to surfaces may be analyzed in any direction. In some embodiments, the image sensors capture the images of the projected laser light emissions and processes the image. Using computer vision technology, the distances between light points is extracted and the distances may be analyzed.

DETAILED DESCRIPTION

Figure 1A:
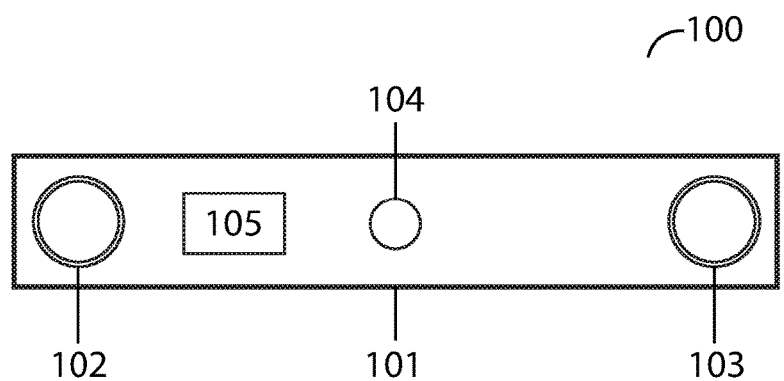
FIG. 1A illustrates a front elevation view of the distance estimation device embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention. The disclosure described herein is directed generally to one or more processor-automated methods and/or systems that estimate distance of a device with an object also known as distance estimation systems.

This invention presents a distance estimation system comprising: a laser light emitter disposed on a baseplate emitting a collimated laser beam creating an illuminated area hereinafter referred to as a light point or projected light point on surfaces that are substantially opposite the emitter; two image sensors disposed on the baseplate, positioned at a slight inward angle with respect to the laser light emitter so that the fields of view of the two image sensors overlap and capture the projected light point within a predetermined range of distances, the image sensors simultaneously and iteratively capturing images; an image processor overlaying the images taken by the two image sensors to produce a superimposed image showing the light points from both images in a single image; extracting a distance between the light points in the superimposed image; and, comparing the distance to figures in a preconfigured table that relates distances between light points with distances between the baseplate and surfaces upon which the light point is projection (which may be referred to as 'projection surfaces' herein) to find an estimated distance between the baseplate and the projection surface at the time the images of the light point were captured.

The preconfigured table is constructed from actual measurements of distances between the light points in superimposed images at increments in a predetermined range of distances between the baseplate and the projection surface.

Each image taken by the two image sensors shows the field of view including the light point created by the collimated laser beam. At each discrete time interval, the image pairs are overlaid creating a superimposed image showing the light point as it is viewed by each image sensor. Because the image sensors are at different locations, the light point will appear at a different spot within the image frame in the two images. Thus, when the images are overlaid, the resulting superimposed image will show two light points until such a time as the light points coincide. The distance between the light points is extracted by the image processor using computer vision technology, or any other type of technology known in the art. This distance is then compared to figures in a preconfigured table that relates distances between light points with distances between the baseplate and projection surfaces to find an estimated distance between the baseplate and the projection surface at the time that the images were captured.

Figure 1B:
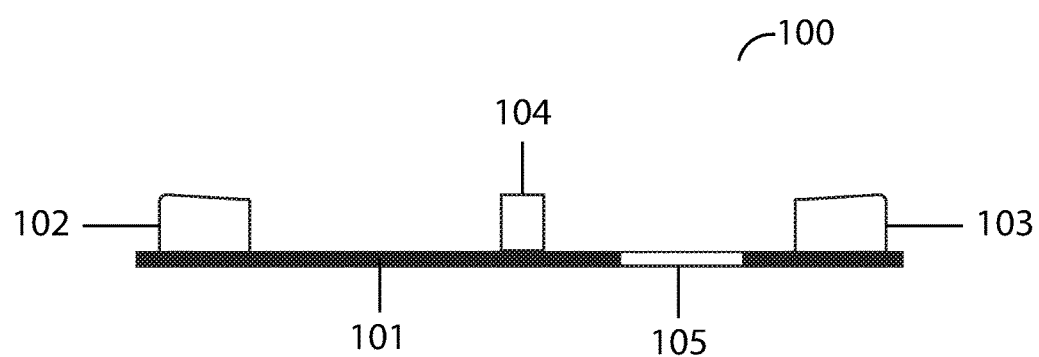
FIG. 1B illustrates an overhead view of the distance estimation device embodying features of the present invention.

Referring to FIG. 1A, a front elevation view of distance estimation system 100 is illustrated. Distance estimation system 100 is comprised of baseplate 101, left image sensor 102, right image sensor 103, laser light emitter 104, and image processor 105. The image sensors are positioned with a slight inward angle with respect to the laser light emitter. This angle causes the fields of view of the image sensors to overlap. The positioning of the image sensors is also such that the fields of view of both image sensors will capture laser projections of the laser light emitter within a predetermined range of distances. Referring to FIG. 1B, an overhead view of remote estimation device 100 is illustrated. Remote estimation device 100 is comprised of baseplate 101, image sensors 102 103, laser light emitter 104, and image processor 105.

Figure 2:
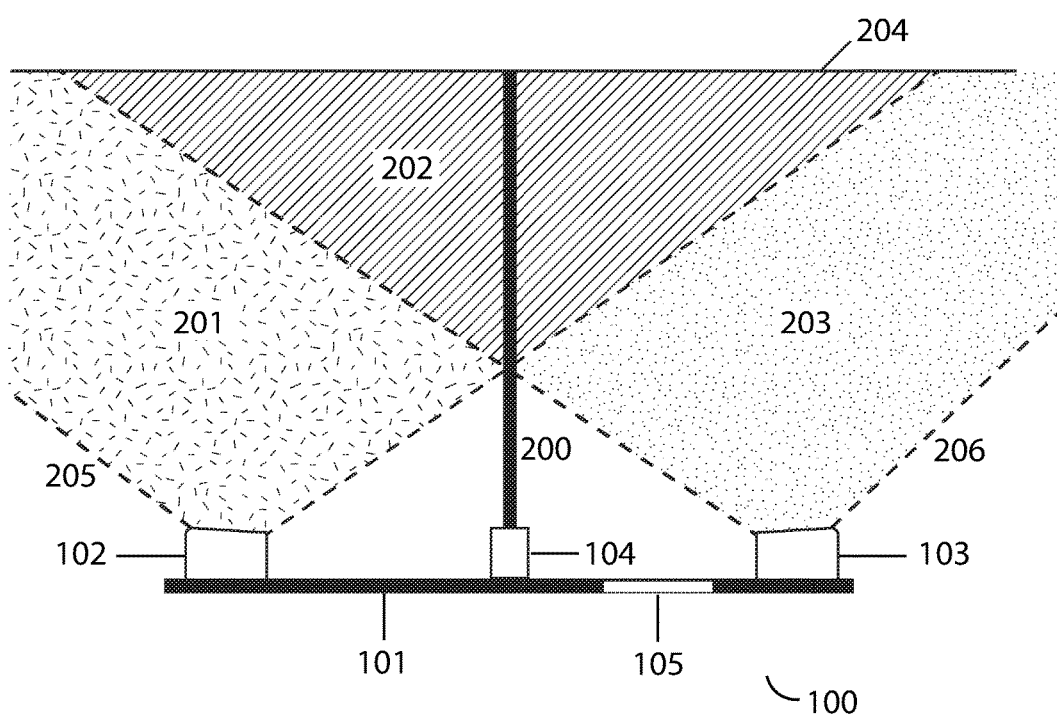
FIG. 2 illustrates an overhead view of the distance estimation device and fields of view of the image sensors embodying features of the present invention.

Referring to FIG. 2, an overhead view of the remote estimation device and fields of view of the image sensors is illustrated. Laser light emitter 104 is disposed on baseplate 101 and emits collimated laser light beam 200. Image processor 105 is located within baseplate 101. Area 201 and 202 together represent the field of view of image sensor 102. Dashed line 205 represents the outer limit of the field of view of image sensor 102. (It should be noted that this outer limit would continue on linearly, but has been cropped to fit on the drawing page.) Area 203 and 202 together represent the field of view of image sensor 103. Dashed line 206 represents the outer limit of the field of view of image sensor 103. (It should be noted that this outer limit would continue on linearly, but has been cropped to fit on the drawing page.) Area 202 is the area where the fields of view of both image sensors overlap. Line 204 represents the projection surface. That is, the surface onto which the laser light beam is projected.

Figure 3A:
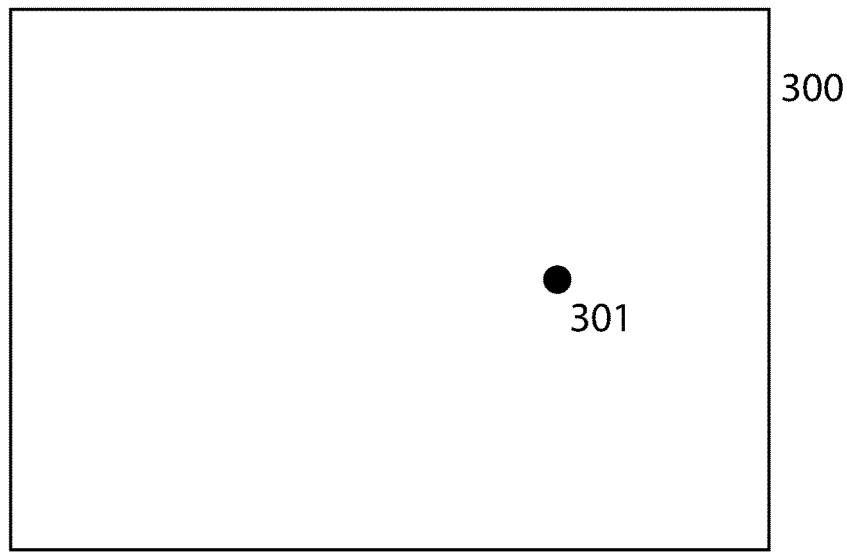
FIG. 3A illustrates an image captured by a left image sensor embodying features of the present invention.
Figure 3B:
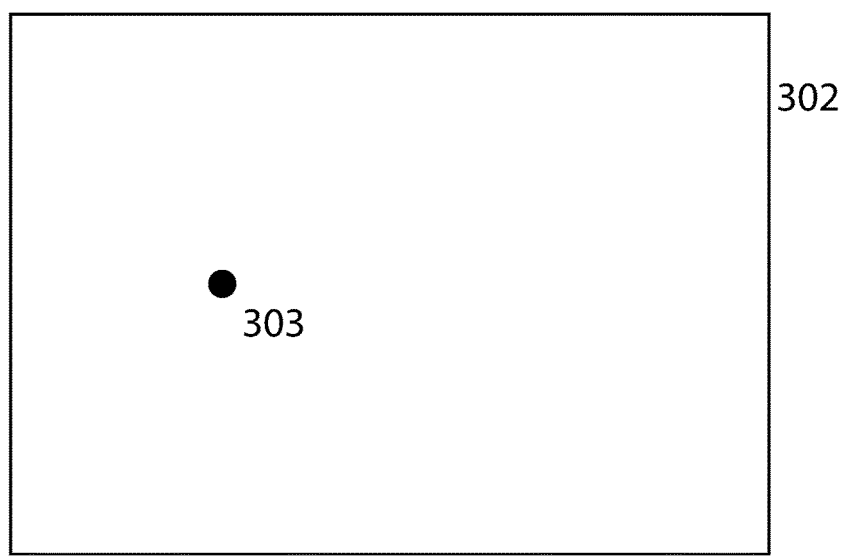
FIG. 3B illustrates an image captured by a right image sensor embodying features of the present invention.

The image sensors simultaneously and iteratively capture images at discrete time intervals. Referring to FIG. 3A, the image captured by left image sensor 102 (in FIG. 2) is illustrated. Rectangle 300 represents the field of view of image sensor 102. Point 301 represents the light point projected by laser beam emitter 104 as viewed by image sensor 102. Referring to FIG. 3B, the image captured by right image sensor 103 (in FIG. 2) is illustrated. Rectangle 302 represents the field of view of image sensor 103. Point 303 represents the light point projected by laser beam emitter 104 as viewed by image sensor 102. As the distance of the baseplate to projection surfaces increases, light points 301 and 303 in each field of view will appear further and further toward the outer limits of each field of view, shown respectively in FIG. 2 as dashed lines 205 and 206. Thus, when two images captured at the same time are overlaid, the distance between the two points will increase as distance to the projection surface increases.

Figure 4:
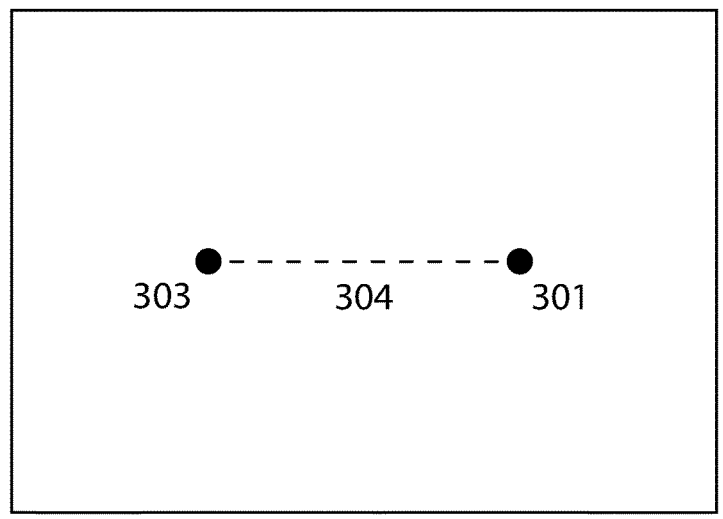
FIG. 4 illustrates an image captured by a right image sensor and an image captured by a left image sensor overlaid embodying features of the present invention.

Referring to FIG. 4, the two images from FIG. 3A and FIG. 3B are shown overlaid. Point 301 is located a distance 304 from point 303. The image processor 105 (in FIG. 1A) extracts this distance. The distance 304 is then compared to figures in a preconfigured table that co-relates distances between light points in the system with distances between the baseplate and projection surfaces to find an estimate of the actual distance from the baseplate to the projection surface upon which the images of the laser light projection were captured.

In some embodiments, the distance estimation device further includes a band-pass filter to limit the allowable light.

In some embodiments, the baseplate and components thereof are mounted on a rotatable base so that distances may be estimated in 360 degrees of a plane.

We claim:
1. A method for remotely estimating distance comprising:
 emitting a collimated laser beam from a laser light emitter disposed on a baseplate, the collimated laser beam;
 projecting a light point on a surface opposite the laser light emitter;
 capturing images of the projected light point by each of at least two image sensors disposed on the baseplate such that the light point is contained within a predetermined range of distances and positioned at an inward angle with respect to the laser light emitter;

overlaying the images captured by the at least two image sensors by using an image processor to produce a superimposed image showing both captured images in a single image;

measuring a first distance between the captured images of the projected light point in the superimposed image; and extracting a second distance from a preconfigured table that relates distances between light points with distances between the baseplate and the surface on which the collimated laser beam is projected to find an estimated distance between the baseplate and the surface on which the collimated laser beam is currently being projected based on the first distance between the captured images.

2. The method of claim 1 wherein the figures in the preconfigured table contain actual measurements of the first distances between the captured images of the projected light points at increments within a predetermined range of the second distances from a surface on which the collimated laser beam is projected and corresponding distances between the baseplate and the surface on which the collimated laser beam is projected.

3. The method of claim 1 wherein the baseplate and components thereof are mounted on a rotatable base, and wherein the baseplate may be rotated in any direction within a plane.

4. A remote distance estimation system comprising:
a laser light emitter disposed on a baseplate emitting a collimated laser beam and projecting a light point projected on a surface opposite the laser light emitter;
at least two image sensors that simultaneously capture images of the projected light point, the at least two image sensors being disposed on the baseplate and positioned at an inward angle with respect to the laser light emitter such that the fields of view of the image sensors overlap and contain the laser beam emissions within a predetermined range of distances; and
an image processor, wherein the image processor is configured to:
overlay the images captured by the at least two image sensors of the projected light point to produce a superimposed image showing the light points from both captured images,
measure a first distance between the captured images of the projected light point in the superimposed image, and
compares a second distance from a preconfigured table that relates distances between light points with distances between the baseplate and the surface on which the collimated laser beam is projected to find an estimated distance between the baseplate and the surface on which the collimated laser beam is currently being projected based on the first distance between the captured images.

5. The remote distance estimation system of claim 4 wherein the image processor measures the first distance between the captured images of the projected light points by examining the pixel information of the superimposed image, determining coordinates of the projected light points, and calculating the first distance between them.

6. The remote distance estimation system of claim 4 wherein the preconfigured table contains the first distances between the captured images of the projected light points at increments within a predetermined range of the second distances from a surface on which the collimated laser beam is projected between the baseplate and the surface on which the collimated laser beam is projected.

7. The remote distance estimation system of claim 4 wherein the baseplate and components thereof are mounted on a rotatable base, and wherein the baseplate may be rotated in any direction within a plane.

8. A computing device program product for utilizing a distance estimation system comprising:
a non-transitory computer readable medium;
first programmatic instructions for a laser light emitter disposed on a baseplate to emit a collimated laser beam creating one light point projected on a surface opposite the emitter;
second programmatic instructions for at least two image sensors disposed on the baseplate and positioned at an inward angle with respect to the laser light emitter such that each capture an image of the projected light point;
third programmatic instructions for an image processor to overlay the images captured by the at least two image sensors to produce a superimposed image showing both captured images in a single image; and
fourth programmatic instructions for the image processor to measure a first distance between the captured images of the projected light point in the superimposed image, and extract a second distance from a preconfigured table that relates distances between light points with distances between the baseplate and the surface on which the collimated laser beam is projected to find an estimated distance between the baseplate and the surface on which the collimated laser beam is currently being projected.

9. The computing device program product for utilizing a distance estimation system of claim 8 wherein the preconfigured table contains actual measurements of the first distances between the captured images of the projected light points at increments within a predetermined range of the second distances from a surface on which the collimated laser beam is projected and corresponding distances between the baseplate and the surface on which the collimated laser beam is projected.

* * * * *